US008494035B2

(12) United States Patent
Bourdoux et al.

(10) Patent No.: US 8,494,035 B2
(45) Date of Patent: Jul. 23, 2013

(54) FREQUENCY-DOMAIN ADAPTIVE FEEDBACK EQUALIZER

(75) Inventors: Andre Bourdoux, Esneux (BE);
Hidekuni Yomo, Osaka (JP); Kiyotaka Kobayashi, Osaka (JP)

(73) Assignees: IMEC, Leuven (BE); Panasonic Corporation, Osaka (JP)

( * ) Notice: Subject to any disclaimer, the term of this patent is extended or adjusted under 35 U.S.C. 154(b) by 27 days.

(21) Appl. No.: 13/158,295

(22) Filed: Jun. 10, 2011

(65) Prior Publication Data
US 2012/0236926 A1   Sep. 20, 2012

Related U.S. Application Data

(60) Provisional application No. 61/454,468, filed on Mar. 18, 2011.

(51) Int. Cl.
*H04L 5/16* (2006.01)
*H04B 1/38* (2006.01)

(52) U.S. Cl.
USPC ........... 375/219; 375/229; 375/232; 375/233; 375/316

(58) Field of Classification Search
USPC .......................... 375/219, 229, 232, 233, 316
See application file for complete search history.

(56) References Cited

U.S. PATENT DOCUMENTS

| 5,367,536 | A | * | 11/1994 | Tsujimoto | ..................... | 375/269 |
| 2002/0168002 | A1 | | 11/2002 | Birru | | |
| 2004/0021595 | A1 | * | 2/2004 | Erdogan et al. | ............... | 341/144 |
| 2010/0046599 | A1 | * | 2/2010 | Kim et al. | ..................... | 375/233 |

FOREIGN PATENT DOCUMENTS

| WO | WO 02/33964 A1 | 4/2002 |
| WO | WO 2006/105309 A1 | 10/2006 |

OTHER PUBLICATIONS

M. Ghosh, "Blind Decision Feedback Equalization for Terrestrial Television Receivers" Proc. IEEE, vol. 86, No. 10, pp. 2070-2081, Oct. 1998.
S. Tomasin, "Overlap and Save Frequency Domain DFE for Throughput Efficient Single Carrier Transmission", IEEE $16^{th}$ Int'l Symp. Personal, Indoor and Mobile Radio Communications, Sep. 2005.
B. Liu et al., "Frequency Domain Feedforward Filter Combined DFE Structure in Single Carrier Systems over Time-varying Channels", IEEE Trans. Cons. Electronics, vol. 54, No. 4, Nov. 2008.

(Continued)

*Primary Examiner* — Ted Wang
(74) *Attorney, Agent, or Firm* — Knobbe Martens Olson & Bear LLP (57) ABSTRACT

A circuit for adaptive feedback equalization is disclosed. In one aspect, the circuit includes a frequency-domain feedforward filtering section and a feedback filtering section, a slicer to slice a block of equalized symbols, a summing module for summing outputs of the filtering sections thereby yielding the block of equalized symbols. First and second updating modules provide coefficient updates to the filtering sections. The updating modules are fed with a frequency-domain converted block of error signals indicating the difference between the block of equalized symbols at the slicer input and the block of sliced symbols at the slicer output and for computing updates using the frequency-domain converted block of error signals. A time-domain compensation module receives a time-domain version of the updated filter coefficients of the feedback filtering section and symbols of the block of sliced symbols. It adds a feedback error compensation signal to the block of equalized symbols.

18 Claims, 4 Drawing Sheets

OTHER PUBLICATIONS

J. Shynk, "Frequency-domain and Multirate Adaptive Filtering", IEEE Signal Proc. Magazine, vol. 9, No. 1, pp. 14-37, Jan. 1992.

Ai-Dhahir and J. Cioffi, "Mmse Decision Feedback Equalizers: Finite-length Results", IEEE Transactions on Information Theory, vol. 41, No. 4, pp. 961-975, Jul. 1995.

Extended European Search Report for European Patent Application No. 11169506.0-1237, issued on Aug. 29, 2012.

Berberidis et al., "A frequency-domain decision feedback equalizer for multipath echo cancellation", Globecom, 1995, pp. 98-102, http://ieeexplore.ieee.org/stamp.stamp.jsp?tp=&arnumber=500277.

Kostas Berberidis, "An efficient block adaptive decision feedback equalizer implemented in the frequency domain" IEEE Transactions on Signal Processing, vol. 50, No. 9, Sep. 2002, pp. 2273-2285.

* cited by examiner

FREQUENCY-DOMAIN ADAPTIVE FEEDBACK EQUALIZER

CROSS REFERENCE TO RELATED APPLICATIONS

This application claims priority under 35 U.S.C. §119(e) to U.S. provisional patent application 61/454,468 filed on Mar. 18, 2011, which application is hereby incorporated by reference in its entirety.

BACKGROUND OF THE INVENTION

1. Field of the Invention

The disclosed technology generally relates to single-carrier communication systems wherein adaptive feedback equalization is applied.

2. Description of the Related Technology

In outdoor wireless applications the multipath channel exhibits very long impulse responses, which can lead to delay spreads of several tens of microseconds. This can be of particular importance in e.g. cellular or broadcast applications. When transmitting at high rate over such channels, the introduced intersymbol interference (ISI) can span hundreds of symbols and, hence, severely distorts the received signals. To cope with such ISI, very long decision feedback equalizers (DFE) are required at the receiver to properly recover the transmitted signal. The design of such equalizer can be very complex and occupy a large chip area since certain performance requirements have to be met.

Decision feedback equalizers (DFE), consisting of a feedforward (FF) and a feedback (FB) filter, are well known in the art. They are preferred to linear equalizers because of their effectiveness at reducing the ISI. This stems mainly from their ability to cancel very efficiently the post-cursor portion of the ISI. This is done by optimally computing the feedforward and feedback coefficients, provided that the channel impulse response is known at the receiver. When this is not the case and the transmission extends over a large number of symbols (as e.g. in broadcasting systems), an adaptive DFE provides the means to compute adaptively the filter coefficients without any prior knowledge about the channel. According to the system definition, this adaptation can be carried out in a data-aided (trained) mode or non data-aided (blind) mode.

Although trained or blind DFEs may provide satisfactory performance, even in high delay spread channels, their implementation complexity grows linearly with the channel length expressed in number of symbol instants. When this length reaches several hundreds of symbol instants, the number of operations can easily exceed a thousand complex multiplications per symbol. For a symbol rate of 10 MHz, which is typical of broadband systems, this translates into 10 billion complex multiplications per seconds, which requires a very high power consumption and/or silicon area. To reduce the burden of the DFE implementation, frequency domain (FD) techniques have been proposed, which enable performing so-called fast convolutions (or correlations), thereby significantly reducing the implementation complexity.

Considering the use of FD processing for the linear equalizer is quite straightforward because it is a direct application of the fast convolution or correlation. On the contrary, FD processing for the feedback part of a DFE has been rarely and not always convincingly addressed. The FD DFE presented in the papers "*Blind Decision Feedback Equalization for Terrestrial Television Receivers*" (M. Ghosh, Proc. IEEE, vol. 86, no. 10, pp. 2070-2081, October 1998) and "*Overlap and Save Frequency Domain DFE for Throughput Efficient Single Carrier Transmission*" (S. Tomasin, IEEE 16th Int'l Symp. Personal, Indoor and Mobile Radio Communications, September 2005) only have the feedforward part in the FD. The main reason is that the FD block processing does not lend itself easily to the feedback process. The FD approach in "*Frequency Domain Feedforward Filter Combined DFE Structure in Single Carrier Systems over Time-varying Channels*" (B. Liu et al., IEEE Trans. Cons. Electronics, vol. 54, no. 4, November 2008) targets mainly single-carrier (SC) systems with cyclic extension and is also limited to the FF part. In "*Frequency-domain and Multirate Adaptive Filtering*" (J. Shynk, IEEE Signal Proc. Magazine, vol. 9, no. 1, pp. 14-37, January 1992) both the FF and FB part, including the weight update, are done in the FD, but the FB is less performant than in the TD case because the new decisions obtained after the DFTs are not fed back until the next DFT is computed.

Regarding notational conventions, normal Latin characters are used for time-domain signals (a) and tilde characters for frequency-domain signals ($\tilde{a}$), vectors and matrices are denoted by a single and double under-bar, respectively, ($\underline{a}$ and $\underline{\underline{A}}$). The superscripts $*$, $T$ and $H$ denote the complex conjugate, the matrix transpose and complex conjugate transpose, respectively. The Hadamard (i.e. element-wise) product of vectors is denoted by the $\odot$ operator. Any matrix in this description represented by a $\underline{\underline{Q}}$ followed by a subscripted letter denotes a zero padding matrix. The operator $\underline{\underline{F}}$ represents a FFT block operation.

Figure 1:
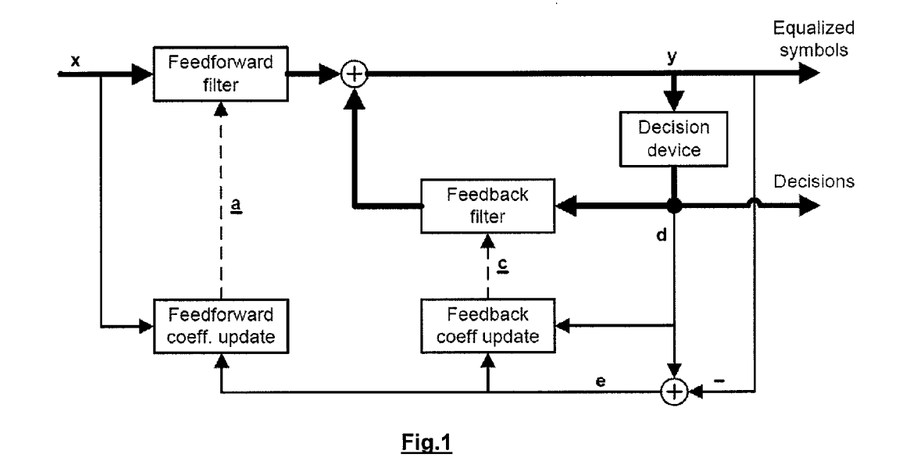
FIG. 1 represents schematically a generic TD LMS-DFE as known in the art, whereby the filter paths are shown with thick lines and the weight update paths are shown in thin lines.

Before a decision feedback equalization scheme as known in the art is described more in detail, a system model is introduced. The transmission is considered of a sequence of possibly complex symbols over a complex multipath channel and affected by additive white Gaussian noise. The discrete-time equivalent of the received signal x(t) can be expressed as:

$$x(k) = \sum_{l=0}^{L-1} s(k-l)h(l) + n(k) \quad (1)$$

where s(l) is the sequence of the transmitted symbols and h(k) denotes the channel impulse response of length L. The received signal x(k) is fed to a DFE (see FIG. 1) that satisfies the following relationship $$y(k) = \sum_{i=0}^{A} a_i^*(k)x(k+d_a-i) + \sum_{i=1}^{C} c_i^*(k)d(k-i) \quad (2)$$

$$d(k) = f\{y(k)\} \quad (3)$$

where $a_i(k)$ are the A coefficients of the feedforward filter, $c_i(k)$ are the C coefficients of the feedback filter, $d_a$ is the delay of the feedforward filter and f{.} is the demodulation operator (slicer—in FIG. 1 named 'decision device'). In many practical systems, the channel is not known at the receiver and it may be difficult to estimate the channel directly. Adaptive algorithms are then used to adapt the weights $a_i(k)$ and $c_i(k)$ so as to reduce the variance of the estimation error. Although many high performance algorithms exist, the least-mean square (LMS) algorithm is often used in practice for complexity reasons, especially when the filter lengths A and C are large. The LMS adaptation rule is as follows:

$$e(k) = d(k) - y(k) \quad (4)$$

$$a_i(k+1) = a_i(k) + 2\mu^a x(k-i)e(k) \quad (5)$$

$$c_i(k+1) = c_i(k) + 2\mu^c x(k-i)e(k) \quad (6)$$

The LMS algorithm used in combination with the proposed implementation of the DFE provides the simplest adaptation algorithm. However, its complexity increases as the channel length becomes larger. This is because the filtering operations in (2) involve convolutions of length A and C and the updates in (5) and (6) involve correlations of length A and C as well. Since the filter length must be approximately equal to or even greater than the channel length, the total complexity of the LMS-DFE is approximately equal to 4L possibly complex multiplications per output symbol, which may be challenging for channel lengths with hundreds of taps. It has been identified that the frequency domain (FD) processing is an interesting alternative to the time domain (TD) convolutions and correlations as in (2), (5) and (6). Indeed, it is well known that for a length $L_x$ sequence x and length $L_y$ sequence y $$\text{conv}(x,y)=\text{IDFT}(\text{DFT}(x)\odot\text{DFT}(y)) \quad (7)$$

$$\text{corr}(x,y)=\text{IDFT}(\text{DFT}(x)^*\odot\text{DFT}(y)) \quad (8)$$

provided that the discrete Fourier transform (DFT) and inverse discrete Fourier transform (IDFT) are taken over a length larger than or equal to $L_x+L_y-1$. Zeros must be padded to x and y before taking the DFT to achieve this. This alternative implementation is attractive for large $L_x$ and/or $L_y$ if the fast direct and inverse Fourier transforms (FFT and IFFT) are used. When one of the sequences is infinite, it must be split into blocks and special techniques, known as overlap-and-save and overlap-and-add, must be used to recombine the blocks after (7) or (8) is applied.

Hence, there is a need for an adaptive feedback equalization scheme of reasonable complexity, which is suitable for applications where relatively long impulse responses are encountered.

SUMMARY OF CERTAIN INVENTIVE ASPECTS

Certain inventive aspects relate to a circuit for adaptive feedback equalization wherein all filtering and filter coefficient updating is performed in the frequency domain and wherein the same performance as a time domain implementation is achieved at a reduced complexity.

The present technology relates in a first aspect to a circuit for adaptive feedback equalization. The circuit comprises a) a feedforward filtering section wherein a frequency domain filtering is applied on a received block of symbols, b) a slicer to slice a block of equalized symbols, whereby a block of sliced symbols is output, c) a feedback filtering section wherein a frequency domain filtering is applied on the frequency domain converted block of sliced symbols, d) summing means for summing the outputs of the feedforward filtering section and the feedback filtering section, thereby yielding the block of equalized symbols, e) first and second updating means to provide coefficient updates to the feedforward filtering section and to the feedback filtering section, respectively, whereby the first and second updating means are fed with a frequency domain converted block of error signals indicative of the difference between the block of equalized symbols at the slicer input and the block of sliced symbols at the slicer output and for computing updates using the frequency domain converted block of error signals, and f) time-domain compensation means arranged for receiving a time-domain converted version of the updated filter coefficients of the feedback filtering section and for receiving symbols of the block of sliced symbols and for adding a feedback error compensation signal to the block of equalized symbols.

More specifically, the feedforward filtering section is arranged for applying a frequency domain filtering on a received block of symbols represented in the frequency domain.

The circuit comprises a plurality of conversion means for converting blocks of symbols between time domain and frequency domain and vice versa.

A slicer is provided, arranged for slicing a time domain converted version of a block of equalized symbols and for outputting a block of sliced symbols.

The equalizer circuit further contains a feedback filtering section arranged for applying a frequency domain filtering on a frequency domain converted version of the block of sliced symbols.

Via summing means the outputs of the feedforward filtering section and the feedback filtering section are summed, whereby the already mentioned block of equalized symbols in the frequency domain is obtained.

Further there are first updating means adapted for providing updates of the frequency domain coefficients to the feedforward filtering section and second updating means adapted for providing updates of the frequency domain coefficients to the feedback filtering section, whereby the first and second updating means are arranged for being fed with a frequency domain converted block of error signals indicative of the difference between the time domain converted version of the block of equalized symbols at the input of the slicer and the block of sliced symbols at the output of the slicer and for computing the updates using the frequency domain converted block of error signals.

The equalizer circuit is characterized by a time-domain compensation means arranged for receiving a time-domain converted version of the updated filter coefficients of the feedback filtering section and for receiving symbols of the block of sliced symbols and for adding a feedback error compensation signal to the time domain converted version of the block of equalized symbols.

Advantageously the time-domain compensation means is a variable length filter.

In a preferred embodiment the first and second updating means are arranged for operating according to a least-mean-squares algorithm. Although also other adaptation algorithms can be employed, a least-mean-squares approach is preferable because of its simplicity.

The first and second updating means are preferably arranged for performing a windowing operation in the time domain.

In an advantageous embodiment the feedback filtering section is arranged for applying a frequency domain filtering on a frequency domain converted version not of the block of sliced symbols, but rather of the time domain converted version of the block of equalized symbols in the frequency domain. Hence, in such an embodiment, the equalized signal is fed back rather than the decisions. This embodiment is then a frequency-domain adaptive IIR (Infinite impulse response) filter. This embodiment can advantageously be applied during an acquisition phase when the post-equalization signal-to-noise ratio is low.

In another aspect, there is a method for performing adaptive feedback equalization comprising a) receiving a block of symbols represented in the frequency domain, b) applying a frequency domain filtering on the received block in a feedforward filtering section of an equalizer circuit, c) slicing a time domain converted version of a block of equalized symbols and outputting a block of sliced symbols, d) applying in a feedback filtering section of the equalizer circuit a frequency domain filtering on a frequency domain converted version of the block of sliced symbols, e) summing the outputs of the feedforward filtering section and the feedback filtering section, thereby obtaining the block of equalized symbols in the frequency domain, f) providing updates of the frequency domain coefficients to the feedforward filtering section and updates of the frequency domain coefficients to the feedback filtering section, the updates being derived from a frequency domain converted block of error signals indicative of the difference between the time domain converted version of the block of equalized symbols used in the slicing operation and the block of sliced symbols resulting from the slicing, whereby the frequency domain converted block of error signals are used for computing the updates, and g) determining a time-domain feedback error compensation signal from a time-domain converted version of the updated filter coefficients of the feedback filtering section and from received symbols of the block of sliced symbols, and adding the feedback error compensation signal to the time domain converted version of the block of equalized symbols.

In a preferred embodiment the step of determining a time-domain feedback error compensation signal comprises a filtering with a variable length filter.

Advantageously the step of determining a time-domain feedback error compensation signal comprises a frequency domain conversion of at least a portion of the symbols of the block of sliced symbols.

BRIEF DESCRIPTION OF THE DRAWINGS

For a better understanding of the present disclosure, reference will now be made, by way of example only, to the accompanying drawings in which:—

DETAILED DESCRIPTION OF CERTAIN ILLUSTRATIVE EMBODIMENTS

Certain embodiments relate to a scheme wherein both the feedforward and feedback filters and feedforward and feedback update paths are fully implemented in the frequency domain (FD). The proposed solution further comprises a time domain compensation means to compensate for the feedback error within a block after the DFT of the sliced symbols is computed. The compensation is in one embodiment fully performed in the time domain. In another embodiment the compensation is advantageously performed in part by the time domain compensation means and in part by applying a frequency domain mechanism with an intermediate FFT/IFFT operation, which allows for an additional complexity reduction, as will be explained in detail below. The proposed Frequency Domain Feedback Equalization scheme operates on blocks of size B, whereby the coefficients update is calculated after every output symbol, but is applied only after B symbols are outputted, which is known as block feedback equalization (FE).

In the rest of this description certain embodiments will be explained using a well-known least mean squares (LMS) updating algorithm. However, the skilled person will readily appreciate that any other adaptation algorithm known in the art can be employed in combination with the proposed implementation.

In one embodiment, the scheme has the following features.

All filters and updates are performed in the frequency domain (FD).

The FFTs and IFFTs are computed for every block of B input samples, producing B output symbols.

After the output IFFT is computed and the first output symbol is sliced, a time domain (TD) compensation is introduced to compensate for the missing sliced symbols in the feedback filter. This TD compensation can be seen as a FIR filter, the length of which increases by one tap after each output symbol, reaching a length B−1 at the end of the block.

In order to reduce the length of this variable-length TD compensation, a novel FD mechanism is introduced, whereby an intermediate FFT and IFFT are computed after $B_1$ symbols are generated ($B_1$<B). Doing so, the length of the variable-length FIR TD filter is reset to zero, preventing it to increase to the length B−1. This "reset" can be executed several times during a block. The number of times that it is executed is a complexity trade off.

The length A of the feedforward filter, C of the feedback filter, B of the block and $B_1$ of the sub-block can be selected independently of each other. A reduced length FFT size N is used with the milder constraints N≧A+B−1 and N≧C+B−1. In the state of the art, this length is always set to twice the longest filter length, which is avoided in the proposed implementation.

In the following paragraphs these features will be elaborated and described in more detail.

Figure 2:
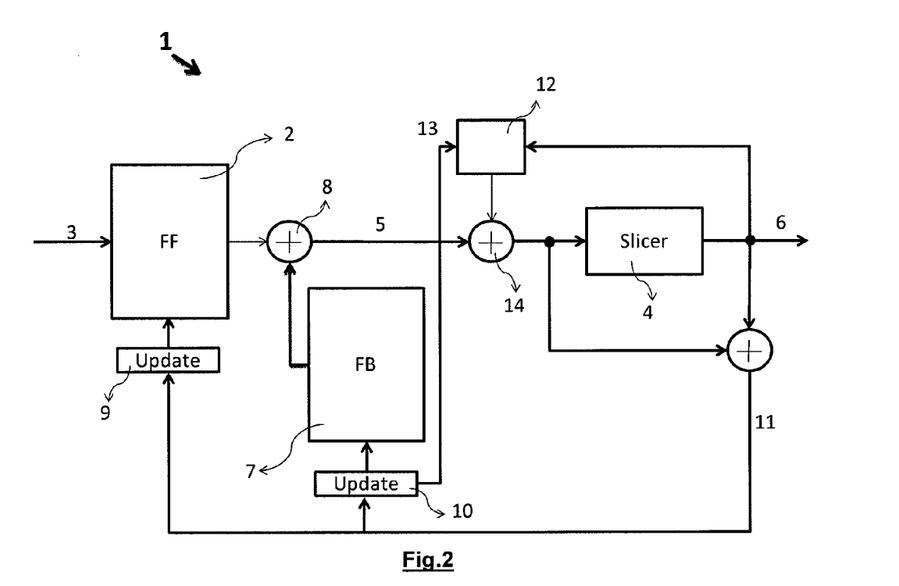
FIG. 2 represents a general view on the equalizer circuit according to one embodiment.
Figure 3:
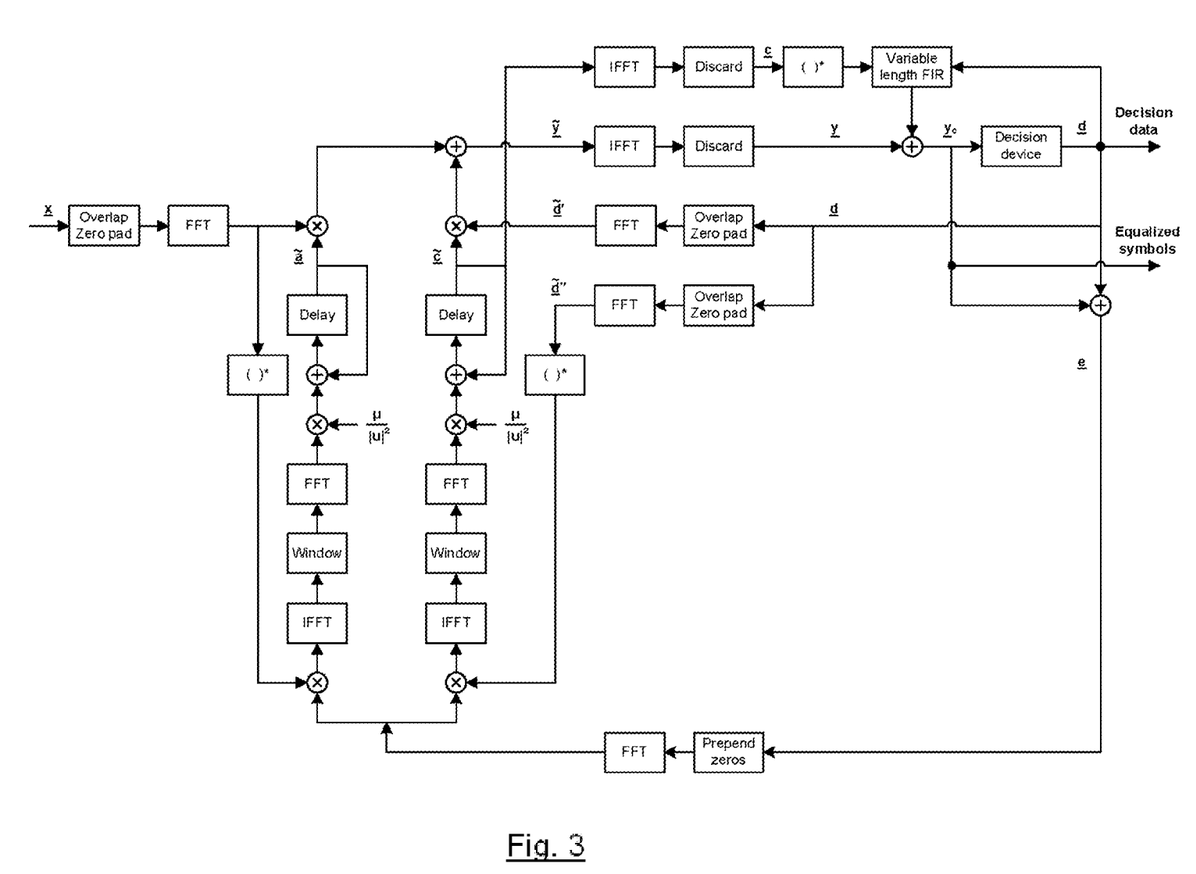
FIG. 3 represents a detailed block diagram of one embodiment of the full FD LMS-DFE.

A high-level view on the equalizer circuit is given in FIG. 2. A more detailed embodiment of a full-LMS decision feedback equalization scheme according to one embodiment is shown in FIG. 3. The operation of the algorithm together with the definition of the variables is as follows. Note that the operations are mostly expressed in matrix form for compactness.

Initialization

The initializations as indicated in equations (9) to (13) are necessary for consistency and for the proper operation of the FD-LMS-DFE.

$$x(j)=0 \text{ for } j=-A+1\ldots-1 \quad (9)$$

$$d(j)=0 \text{ for } j=-C+B\ldots-1 \quad (10)$$

$$\underline{\tilde{a}}(0)=0 \quad (11)$$

$$\underline{\tilde{c}}(0)=0 \quad (12)$$

$$\underline{c}(0)=0 \quad (13)$$

Equalization

A block of B new input symbols x(kN+b) with b=0, . . . , B−1 is fed to the equalizer and prepended with the A−1 past input symbols (see equation 14). It is then zero padded (until the Fast Fourier Transform (FFT) block size N is reached) and transformed to the frequency domain, yielding $\underline{\tilde{x}}(k)$ (15).

$$\underline{x}(k)=[x(kN-A+1)\ldots x(kN+B-1)]^T \quad (14)$$

$$\underline{\tilde{x}}(k)=\underline{F}\cdot\underline{Q}_x\cdot\underline{x}(k) \quad (15)$$

Any matrix in this description represented by a Q followed by a subscripted letter denotes a zero padding matrix. The operator F represents a FFT block operation. For the size of the FFT block N obviously holds that N≧A+B+1.

A block of B new sliced output symbols d(kN+b) with b=0, B−1 is prepended with past sliced output symbols (16). It is then zero padded and transformed to the frequency domain, yielding $\underline{\tilde{d}'}(k)$ (17).

$$\underline{d'}(k)=[d(kN-C+B)\ldots d(kN+B-1)]^T \quad (16)$$

$$\underline{\tilde{d}'}(k)=\underline{\underline{F}}\cdot\underline{\underline{Q}}_{d'}\cdot\underline{d'}(k) \quad (17)$$

The FD FF and FB filters $\tilde{a}(k)$ and $\tilde{c}(k)$ are applied to the input and output symbols (18) and converted to the TD, yielding $\underline{y}(k)$ (19). The first next output symbol y(kN) is correct. However, as subsequent sliced symbols of the block of symbols currently processed by the decision device are not accounted for in the feedback filter section, the B−1 subsequent symbols of the block need to be post-compensated. In one embodiment, illustrated in FIG. 2 and FIG. 3, this is done in the time domain with a variable-length filter (20).

$$\underline{\tilde{y}}(k)=\underline{\tilde{a}}(k)\odot\underline{\tilde{x}}(k)+\underline{\tilde{c}}(k)\odot\underline{\tilde{d}'}(k) \quad (18)$$

$$\underline{y}(k)=\underline{\underline{Q}}_y\cdot\underline{\underline{F}}^H\cdot\underline{\tilde{y}}(k) \quad (19)$$

$$=[y(kN)\ldots y(kN+B-1)]^T$$

$$y_c(kN+b)=y(kN+b)+\sum_{j=1}^{b}c_j(k)d(kN+b-j+1) \quad (20)$$

$$\text{for } b=0\ldots B-1$$

The B output symbols are sliced, yielding $\underline{d}(k)$ (21).

$$\underline{d}(k)=f\{\underline{y}_c(k)\} \quad (21)$$

whereby f(.) denotes the slicer operator.

Update

A block of B new sliced output symbols d(kN+b) with b=0,…, B−1 is prepended with past input symbols (22). It is then zero padded and transformed to the frequency domain, yielding $\underline{\tilde{d}''}(k)$ (23). Note that this requires a different prepending from the one in (16).

$$\underline{d''}(k)=[d(kN-C)\ldots d(kN+B-1)]^T \quad (22)$$

$$\underline{\tilde{d}''}(k)=\underline{\underline{F}}\cdot\underline{\underline{Q}}_{d''}\cdot\underline{d''}(k) \quad (23)$$

A block of B errors e(kN+b) with b=0,…, B−1 is computed, prepended with zeros (24). It is then zero padded and transformed to the frequency domain, yielding $\underline{\tilde{e}}(k)$ (25).

$$\underline{e}(k)=[e(kN)\ldots e(kN+B-1)]^T \quad (24)$$

with $e(k)=d(i)-y(i)$ $$\underline{\tilde{e}}(k)=\underline{\underline{F}}\cdot\underline{\underline{Q}}_e\cdot\underline{e}(k) \quad (25)$$

The FD block $\underline{\tilde{x}}(k)$ is correlated with the FD error block $\underline{\tilde{e}}(k)$ (26). This is followed by a transform to the TD, a rectangular windowing to force the filter length to the desired value A and transformed back to the FD where the update is applied, yielding the FD values of the feedforward filter $\tilde{a}(k+1)$ for the next iteration (26).

$$\underline{\tilde{a}}(k+1)=\underline{\tilde{a}}(k)+2\mu_a\underline{\underline{F}}\cdot\underline{\underline{G}}_a\cdot\underline{\underline{F}}^H\cdot\underline{\tilde{x}}(k)\odot\underline{\tilde{e}}(k) \quad (26)$$

The FD block $\underline{\tilde{d}''}(k)$ is correlated with FD error block $\underline{\tilde{e}}(k)$ (27). This is followed by a transform to the TD, a rectangular windowing to force the filter length to the desired value C and transformed back to the FD where the update is applied, yielding the FD values of the feedforward filter $\underline{\tilde{c}}(k+1)$ for the next iteration (27).

$$\underline{\tilde{c}}(k+1)=\underline{\tilde{c}}(k)+2\mu_c\underline{\underline{F}}\cdot\underline{\underline{G}}_c\cdot\underline{\underline{F}}^H\cdot\underline{\tilde{d}''}(k)\odot\underline{\tilde{e}}(k) \quad (27)$$

The TD version of the feedback filter c is computed and undergoes a rectangular windowing (28), because the TD version is needed for (20).

$$c(k+1)=\underline{\underline{Q}}_c\cdot\underline{\underline{F}}^H\cdot\underline{\tilde{c}}(k) \quad (28)$$

Figure 4:
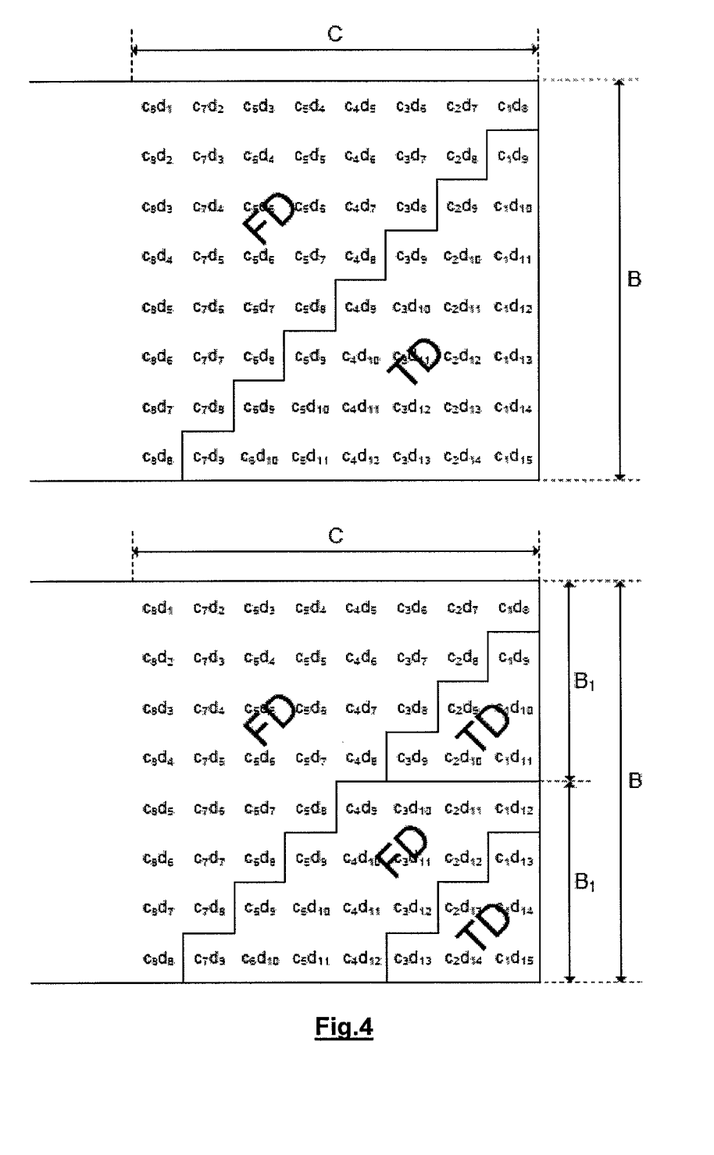
FIG. 4 represents a simple example of the TD post-compensation (top) and the TD post-compensation with one reset (bottom). The equalized symbol is the sum over each row, with the oldest symbol in the first row.

In the embodiment shown in FIG. 3 a post-compensation in the time domain is performed by means of a variable-length filter. This filter still poses a complexity drawback because it reaches a length B−1 at the end of the block. To overcome this drawback an additional FD complexity reduction can be introduced as follows. After $B_1$ symbols have been output, a new block of size B, comprising the $B_1$ newly decided symbols is formed and is convolved in the FD with the FB filter and added to the output vector $\underline{\tilde{y}}(k)$ and converted to the TD. In this way, the new vector $\underline{\tilde{y}}(k)$ includes the feedback of the last $B_1$ symbols and the variable-length filter length can be reset to zero. This "reset" process can be repeated every $B_1$ symbols until the end of the block is reached. It is illustrated pictorially in FIG. 4 for the case $B_1=B/2$. The gain in number of TD multiplications in the variable-length filter is visible in the area difference of the triangles representing the TD post-compensation.

Mathematically, the 'reset' process is expressed as follows:
Apply equation (20) for b=0,…, $B_1-1$.
A block of $B_1$ new sliced output symbols d(kN+b) with b=0,…, $B_1-1$ is zero padded (29) and transformed to the frequency domain, yielding $\underline{\tilde{d}'''}(k)$ (30).

$$\underline{d'''}(k)=[d(kN)\ldots d(kN+B_1-1)]^T \quad (29)$$

$$\underline{\tilde{d}'''}(k)=\underline{\underline{F}}\cdot\underline{\underline{Q}}_{d'''}\cdot\underline{d'''}(k) \quad (30)$$

The post-compensation with these $B_1$ new values is calculated (31). The output symbols, including the post-compensation, are calculated (32).

$$\underline{y}_{pc}(k)=\underline{\underline{Q}}_{y_{pc}}\cdot\underline{\underline{F}}^H\cdot(\underline{\tilde{b}}(k)\odot\underline{\tilde{d}'''}(k)) \quad (31)$$

$$y_c(kN+b)= \quad (32)$$

$$y(kN+b)+y_{pc}(kN+b-B_1)+\sum_{j=1}^{b-B_1}c_j(k)d(kN+b-j+1)$$

$$\text{for } b=B_1\ldots B-1$$

This process (29) to (32) can be repeated for the next subblock of $B_1$ values, in which case (32) is only applied $B_1$ times.

It should be noted that the post-compensation (with or without "reset") is applicable to any DFE and not restricted to the LMS adaptation scheme.

As an example, the proposed implementation is applied to the ATSC (advanced television systems committee) video broadcasting standard. This system uses single-carrier (SC) vestigial-sideband modulation with the main parameters as summarized in Table 1.

TABLE I

ATSC SYSTEM PARAMETERS

| Parameter | Value |
|---|---|
| Symbol rate | 10.76 MHz |
| Pulse shaping | SRRC r = 0.115 |
| Modulation | 8-PAM, VSB |
| Segment duration | 832 symbols |
| Field duration | 313 segment |
| Training portion | 1 segment per field |

In order to demonstrate the benefits of the proposed Frequency domain implementation of the DFE in this example, the most severe channel model among various channel models recommended in "*ATSC Recommended Practice: Receiver Performance Guidelines*" is chosen, known as R2.2—Ensemble 1 to 3. This specific channel model has been designed to explore the equalizer capabilities at the boundary of the recommended range for the equalizer delay span, i.e. they require the longest filters. The specific channel parameters used in this example are detailed in Table II.

TABLE II

ATSC CHANNEL PARAMETERS

| Parameter | Path 1 | Path 2 | Path 3 | Path 4 | Path 5 | Path 6 |
|---|---|---|---|---|---|---|
| Attenuation (dB) | 0 | 3 | 1 | 1 | 3 | 9 |
| Delay (μs) | 0 | −1.8 | 0.15 | 1.8 | 5.7 | 39.8 |
| Phase or Doppler | 0° | 125° | 80° | 45° | ≦5 Hz | 90° |

It is important to note that the actual channel seen by the equalizer in this specific example is actually longer because of the transmitter and receiver digital and analog filters. To cope with such channels, a DFE is selected with the lengths A=547 for the FF filter and C=471 for the FB filter. The block length B may not be too long because of the Doppler component in the channel model. Hence, the block length is set to be equal to half the segment duration: B=416. Then, considering the constraints N≧A+B−1 and N≧C+B−1 as indicated earlier, the FFT length N was set as the smallest power of 2 greater than max(A,C)+B−1, which results in N=1024.

It will be appreciated that the proposed DFE implementation is not limited to the above-mentioned example and can be applied to more generic channel models with different characteristics.

Complexity Comparison of the Time Domain and Frequency Domain Approaches

The complexity comparison between the TD and FD DFE implementation is performed for the example of ATSC broadcasting standard with channel parameters A, C, B and N as calculated above. The amount of calculation is assumed to be dominated by the number of complex multiplications. The comparison is performed using a standard complexity formula for the (I)FFT: $N \log_2(N)$.

TD LMS-DFE: per input sample, the TD DFE must compute A multiplications in the feedforward filter and C multiplications in the feedback filter; it must also execute A multiplications for the feedforward filter coefficient update and C multiplications for the feedback filter coefficient update. In total, this is 2B(A+B) complex multiplications per block.

FD LMS-DFE without "reset": per block of B input samples, the FD-LMS-DFE must execute ten (I)FFTs and four element-wise multiplications. For the variable-length FIR compensation without "reset", the complexity amounts to B(B−1)/2 multiplications.

FD LMS-DFE with "reset": if p "reset" are applied, 2p (I)FFTs and pN multiplications have to computed and the post-compensation is split into p+1 smaller variable-length FIRs, resulting in $$\overline{B}\left(\frac{B}{p+1} - 1\right)\Big/2$$

multiplications.

The results obtained from the comparison are summarized in Table III together with numerical results for the ATSC example previously presented. The estimations clearly illustrate the implementation advantage of the full FD LMS-DFE according to one embodiment, which is further improved by the "reset" in the variable-length FIR, p=1 reset being the optimum for the chosen example.

TABLE III

| DFE implementation | Complexity | Multiplications | Percentage |
|---|---|---|---|
| TD | 2B(A + B) | 846,976 | 100% |
| FD without "reset" | $4N + 10N \log_2(N) + B(B-1)/2$ | 192,816 | 22.8% |
| FD with p "reset" | $p(N + 2N\log_2(N)) + B\left(\frac{B}{p+1} - 1\right)\Big/2$ | 171,506 | 20.2% |

In one embodiment the proposed post-compensation technique with the complexity reduction is also applicable to single-carrier (SC) systems with cyclic prefix (such as used in the LTE/LTE-Advanced uplink and in the SC of 60 GHz (IEEE802.15.3c and IEEE802.11ad and WiGig).

The main benefits of the proposed DFE scheme implemented in the frequency domain in one embodiment can be summarized as follows. The applied (I)FFT length is shorter than in the prior art solutions. In order to obtain a behavior exactly as in the equivalent time domain implementation the FD-DFE is complemented with a time domain post-compensation. By introducing a frequency domain 'reset' the complexity of this time-domain post-compensation can be reduced. The proposed scheme is especially attractive for broadband systems in high delay spread channels such as the ATSC broadcasting systems, for which a significant complexity reduction can be achieved.

In one embodiment, the proposed scheme is further compatible with many variants of decision feedback equalization such as blind or trained equalization. It can also be used for LMS-IIR filters where the equalized signal is fed back instead of the decision. Further, the post-compensation (with or without reset) is applicable to any feedback equalization adaptation scheme.

Figure 5:
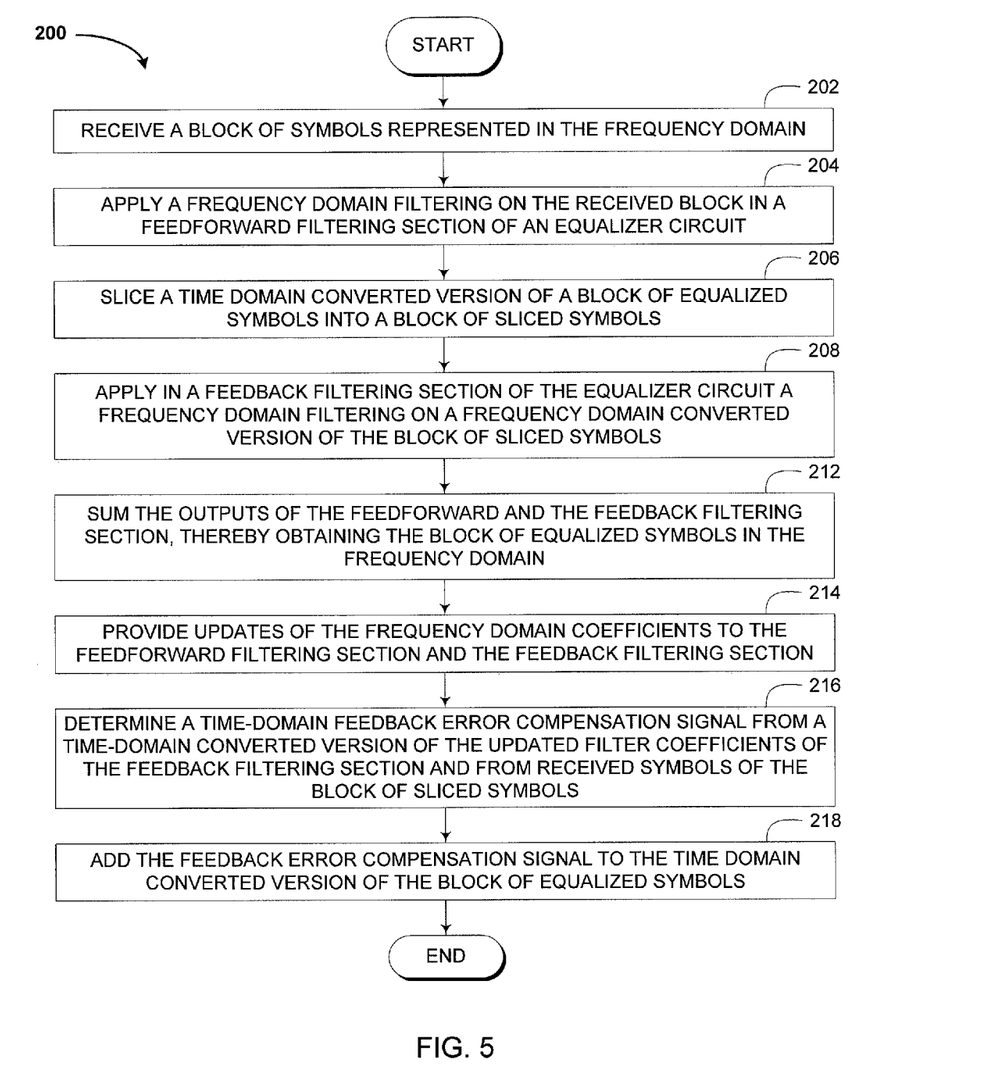
FIG. 5 shows a flowchart of one embodiment of a method of performing adaptive feedback equalization.

FIG. 5 shows a flowchart of one embodiment of a method of performing adaptive feedback equalization. The method 200 includes receiving a block of symbols represented in the frequency domain in block 202. Next at a block 204, the method includes applying a frequency domain filtering on the received block in a feedforward filtering section of an equalizer circuit. Moving to block 206, the method includes slicing a time domain converted version of a block of equalized symbols into a block of sliced symbols. At block 208, the method includes applying in a feedback filtering section of the equalizer circuit a frequency domain filtering on a frequency domain converted version of the block of sliced symbols. Moving to block 212, the method includes summing the outputs of the feedforward filtering section and the feedback filtering section, thereby obtaining the block of equalized symbols in the frequency domain.

Next at block 214, the method includes providing updates of the frequency domain coefficients to the feedforward filtering section and updates of the frequency domain coefficients to the feedback filtering section. In one embodiment, the updates are derived from a frequency domain converted block of error signals indicative of the difference between the time domain converted version of the block of equalized symbols used in the slicing operation and the block of sliced symbols resulting from the slicing, wherein the frequency domain converted block of error signals are used for computing the updates.

At bock 216, the method includes determining a time-domain feedback error compensation signal from a time-domain converted version of the updated filter coefficients of the feedback filtering section and from received symbols of the block of sliced symbols. Moving to block 218, the method includes adding the feedback error compensation signal to the time domain converted version of the block of equalized symbols.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product stored in a computer-readable medium for execution by a programmable processor. Method steps of aspects of the invention may be performed by a programmable processor executing instructions to perform functions of those aspects of the invention, e.g., by operating on input data and generating output data. Accordingly, the embodiment includes a computer program product which provides the functionality of any of the methods described above when executed on a computing device. Further, the embodiment includes a data carrier such as for example a CD-ROM or a diskette which stores the computer product in a machine-readable form and which executes at least one of the methods described above when executed on a computing device.

Although the present disclosure has been illustrated by reference to specific embodiments, it will be apparent to those skilled in the art that the disclosure is not limited to the details of the foregoing illustrative embodiments, and that the present disclosure may be embodied with various changes and modifications without departing from the scope thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the disclosure are capable of operating according to the present disclosure in other sequences, or in orientations different from the one(s) described or illustrated above.

What is claimed is:

1. A circuit for adaptive feedback equalization in the frequency domain comprising:
    a feedforward filtering section configured to apply filtering on a received block of symbols;
    a plurality of conversion modules configured to convert blocks of symbols between time domain and frequency domain;
    a slicer configured to slice a time domain version of a block of equalized symbols and to output a block of sliced symbols;
    a feedback filtering section configured to apply filtering on a frequency domain version of the block of sliced symbols;
    a summing module configured to sum the outputs of the feedforward filtering section and the feedback filtering section, thereby yielding the block of equalized symbols;
    a first updating module configured to update the coefficients of the feedforward filtering section;
    a second updating module configured to update the coefficients of the feedback filtering section, wherein the first and second updating module being configured to receive a block of frequency domain versions of error signals indicative of the difference between the equalized symbols at the input of the slicer and the block of sliced symbols at the output of the slicer and to compute the coefficient updates using the received block of frequency domain versions of error signals; and
    a time-domain compensation module configured to receive a time domain converted version of the updated filter coefficients of the feedback filtering section and to receive the block of sliced symbols, thereby generating a feedback error compensation signal, the feedback error compensation signal being added to the block of equalized symbols.

2. The circuit for adaptive decision feedback equalization as in claim 1, wherein the time-domain compensation module is a variable length filter.

3. The circuit for adaptive decision feedback equalization as in claim 1, wherein the first and second updating module are configured to operate according to a least-mean-squares algorithm.

4. The circuit for adaptive decision feedback equalization as in claim 1, wherein the first and second updating module are configured to perform a windowing operation in the time domain.

5. The circuit for adaptive decision feedback equalization as in claim 1, wherein the feedback filtering section is configured to apply a frequency domain filtering on a frequency domain converted version of the time domain converted version of the block of equalized symbols in the frequency domain.

6. The circuit for adaptive decision feedback equalization as in claim 1, wherein the time-domain compensation module is configured to perform a frequency domain conversion of at least a portion of the symbols of the block of sliced symbols.

7. A method of performing adaptive feedback equalization, the method comprising:
    receiving a block of symbols represented in the frequency domain;

applying a frequency domain filtering on the received block in a feedforward filtering section of an equalizer circuit;

slicing a time domain converted version of a block of equalized symbols into a block of sliced symbols;

applying in a feedback filtering section of the equalizer circuit a frequency domain filtering on a frequency domain converted version of the block of sliced symbols;

summing the outputs of the feedforward filtering section and the feedback filtering section, thereby obtaining the block of equalized symbols in the frequency domain;

providing updates of the frequency domain coefficients to the feedforward filtering section and updates of the frequency domain coefficients to the feedback filtering section, the updates being derived from a frequency domain converted block of error signals indicative of the difference between the time domain converted version of the block of equalized symbols used in the slicing operation and the block of sliced symbols resulting from the slicing, wherein the frequency domain converted block of error signals are used for computing the updates;

determining a time-domain feedback error compensation signal from a time-domain converted version of the updated filter coefficients of the feedback filtering section and from received symbols of the block of sliced symbols; and adding the feedback error compensation signal to the time domain converted version of the block of equalized symbols.

8. The method of performing adaptive feedback equalization as in claim 7, wherein the process of determining a time-domain feedback error compensation signal comprises filtering with a variable length filter.

9. The method of performing adaptive feedback equalization as in claim 7, wherein the process of determining a time-domain feedback error compensation signal comprises a frequency domain conversion of at least a portion of the symbols of the block of sliced symbols.

10. The method of performing adaptive feedback equalization as in claim 7, wherein the method is performed by one or more computing device.

11. The method of performing adaptive feedback equalization as in claim 7, wherein the process of providing updates of the frequency domain coefficients is performed according to a least-mean-squares algorithm.

12. The method of performing adaptive feedback equalization as in claim 7, wherein the process of providing updates of the frequency domain coefficients comprises performing a windowing operation in the time domain.

13. A device for performing adaptive feedback equalization, the device comprising:

means for receiving a block of symbols represented in the frequency domain;

means for applying a frequency domain filtering on the received block in a feedforward filtering section of an equalizer circuit;

means for slicing a time domain converted version of a block of equalized symbols and outputting a block of sliced symbols;

means for applying in a feedback filtering section of the equalizer circuit a frequency domain filtering on a frequency domain converted version of the block of sliced symbols;

means for summing the outputs of the feedforward filtering section and the feedback filtering section, thereby obtaining the block of equalized symbols in the frequency domain;

means for providing updates of the frequency domain coefficients to the feedforward filtering section and updates of the frequency domain coefficients to the feedback filtering section, the updates being derived from a frequency domain converted block of error signals indicative of the difference between the time domain converted version of the block of equalized symbols used in the slicing operation and the block of sliced symbols resulting from the slicing, wherein the frequency domain converted block of error signals are used for computing the updates;

means for determining a time-domain feedback error compensation signal from a time-domain converted version of the updated filter coefficients of the feedback filtering section and from received symbols of the block of sliced symbols; and means for adding the feedback error compensation signal to the time domain converted version of the block of equalized symbols.

14. The device for performing adaptive feedback equalization as in claim 13, wherein the determining means comprises means for filtering with a variable length filter.

15. The device for performing adaptive feedback equalization as in claim 13, wherein the determining means comprises means for performing a frequency domain conversion of at least a portion of the symbols of the block of sliced symbols.

16. The device for performing adaptive feedback equalization as in claim 13, wherein the device comprises one or more processors.

17. The device for performing adaptive feedback equalization as in claim 13, wherein the means for providing updates comprises means for operating according to a least-mean-squares algorithm.

18. The device for performing adaptive feedback equalization as in claim 13, wherein the means for providing updates comprises means for performing a windowing operation in the time domain.

* * * * *

UNITED STATES PATENT AND TRADEMARK OFFICE
CERTIFICATE OF CORRECTION

PATENT NO. : 8,494,035 B2
APPLICATION NO. : 13/158295
DATED : July 23, 2013
INVENTOR(S) : Bourdoux et al.

Page 1 of 1

It is certified that error appears in the above-identified patent and that said Letters Patent is hereby corrected as shown below:

On the title page
Page 2 (item 56, Other Publications) at column 1, line 4, change "Ai-Dhahir" to --Al-Dhahir--.

In the Specification
In column 7 at lines 1-2, change "b=0, B–1" to --b=0, . . . , B–1--.
In column 7 at line 59 (approx.), change " $\tilde{\underline{a}}(k+1) = \tilde{\underline{a}}(k) + 2\mu_a \underline{F} \cdot \underline{G}_a \cdot \underline{F}^H \cdot \tilde{\underline{s}}(k) \odot \tilde{\underline{e}}(k)$ "

to -- $\tilde{\underline{a}}(k+1) = \tilde{\underline{a}}(k) + 2\mu_a \underline{F} \cdot \underline{G}_a \cdot \underline{F}^H \cdot \tilde{\underline{x}}(k) \odot \tilde{\underline{e}}(k)$ --.

In column 8 at line 27 (approx.), change

" $\underline{e}'''(k) = [d(kN) \ldots d(kN+B_1-1)]^T$ "

to -- $\underline{d}'''(k) = [d(kN) \ldots d(kN+B_1-1)]^T$ --.

Signed and Sealed this
Twenty-eighth Day of January, 2014

Michelle K. Lee
*Deputy Director of the United States Patent and Trademark Office*